J. C. SMITH.
ELECTRIC MOTOR CONTROLLER FOR ELEVATORS.
APPLICATION FILED SEPT. 23, 1909.

1,055,292.

Patented Mar. 4, 1913.
8 SHEETS—SHEET 1.

Witnesses
Inventor
J. C. Smith
Attorneys

J. C. SMITH.
ELECTRIC MOTOR CONTROLLER FOR ELEVATORS.
APPLICATION FILED SEPT. 23, 1909.

1,055,292.

Patented Mar. 4, 1913.
8 SHEETS—SHEET 3.

Witnesses

Inventor
J. C. Smith
by H. B. Willson & Co
Attorneys

J. C. SMITH.
ELECTRIC MOTOR CONTROLLER FOR ELEVATORS.
APPLICATION FILED SEPT. 23, 1909.

1,055,292.

Patented Mar. 4, 1913.
8 SHEETS—SHEET 4.

Witnesses
C. H. Griesbauer.

Inventor
J. C. Smith.
by H. R. Willson &co.
Attorneys

J. C. SMITH.
ELECTRIC MOTOR CONTROLLER FOR ELEVATORS.
APPLICATION FILED SEPT. 23, 1909.

1,055,292.  Patented Mar. 4, 1913.
8 SHEETS—SHEET 6.

FIG. 24.

Witnesses
J. M. Fowler

Inventor
John C. Smith
by H. B. Willson & co
Attorneys

UNITED STATES PATENT OFFICE.

JOHN C. SMITH, OF LOUISVILLE, KENTUCKY, ASSIGNOR TO AMERICAN MACHINE COMPANY, OF LOUISVILLE, KENTUCKY.

ELECTRIC-MOTOR CONTROLLER FOR ELEVATORS.

1,055,292.

Specification of Letters Patent. Patented Mar. 4, 1913.

Application filed September 23, 1909. Serial No. 519,134.

*To all whom it may concern:*

Be it known that I, JOHN C. SMITH, a citizen of the United States, residing at Louisville, in the county of Jefferson and State of Kentucky, have invented certain new and useful Improvements in Electric-Motor Controllers for Elevators; and I do declare the following to be a full, clear, and exact description of the invention, such as will enable others skilled in the art to which it appertains to make and use the same.

This invention relates to electric motor controllers for elevators, where variable speed or dynamic braking on the motor is required.

With the foregoing and other objects in view, the invention consists of certain novel features of construction, combination and arrangement of parts, as will be more fully described and particularly pointed out in the appended claims.

In the accompanying drawings, Fig. 17 a section on the line 17—17, Fig. 15, and Fig. 18 a plan view of said speeding switch.

Figure 1:
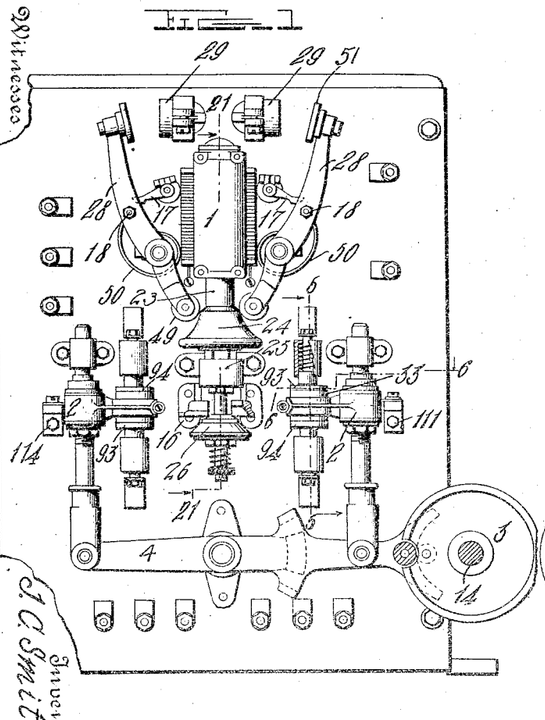
Figure 1 is a front elevation with parts in section, of a mechanically operated variable speed motor controller embodying my improvements.
Figure 2:
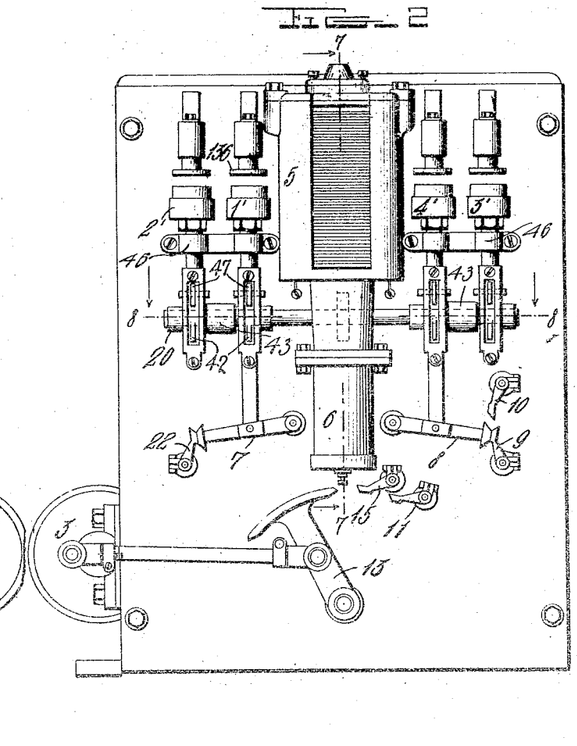
Fig. 2 is a rear elevation of Fig. 1.

Referring to Figs. 1 and 2 of the drawings, 1 indicates the main switch, 2 the reversing switch, 3 the reversing switch crank disk and 4 the reversing switch lever. 5 in Fig. 2 indicates the accelerating solenoid, 6 the dash pot, 7 a switch for inserting resistance into the main switch solenoid, 8 a lever and 9 a contact for inserting resistance into the accelerating solenoid 5. 10 and 11 are contacts for speeding switch 12, and 13 a pilot lever operated from the crank disk shaft 14. The controller, as shown in Figs. 1 and 2, is in a central position with the main switch open and reversing switch closed on both sides. The reversing switch in this position short circuits the armature onto itself through a resistance 141 which is inserted by the switch 16 thus causing a dynamic braking effect on the armature. The reversing switch in this position closes the shunt field onto itself which prevents any arcing and burning of switch contacts caused from the induced current from the motor fields. Revolving the crank disk shaft 14 opens the reversing switch 2 in a certain direction, a further movement of said shaft closing contacts 13 and 15 which supplies line current to the main switch solenoid 1 thereby closing the main switch. A further movement of the crank disk shaft 14 closes contacts 11 and 13 which connects up one side of the speeding switch 12. The main switch now being closed closes the contacts 17 and 18 permitting the current to pass to the solenoid 5 thereby raising the plunger 19 and thus revolving pinion shaft 20 which causes a vertical movement of the accelerating switches 1', 2', 3' and 4'. The movement of the first accelerating switch 1' causes the lever 7 to raise thereby breaking the contacts 7 and 22 which inserts resistance into the main switch solenoid 1 and also forms an open circuit to the solenoid 1 after the main switch opens, such open circuit remaining until contacts 7 and 22 again close. The movement of the last accelerating switch 4' separates contacts 8 and 9 which inserts resistance into the solenoid 5 and also makes contact between the contacts 8 and 10 which connects up the opposite side of the circuit of the speeding switch 12. The speeding switch inserts resistance into the shunt fields of the motor.

The above is a brief description of the operation and the system of control of the variable speed mechanically operated motor controller for elevators or other uses.

I will now describe the design in detail and the working of the various parts which make up the controller.

The main switch 1 comprises the plunger 23, (see Figs. 1 and 21) an upward movement of which causes the main switch levers 28 to close by making contact with the contacts 29 due to the incline of the cone 24. When the main switch levers make contact with contacts 29, the plunger 23 continues to rise and compress spring 30 until the plunger reaches buffer plug 27. The compression of the spring 30 allows for the wear on contacts 29.

Figures 14, 19, 20, 21, 22, 23:
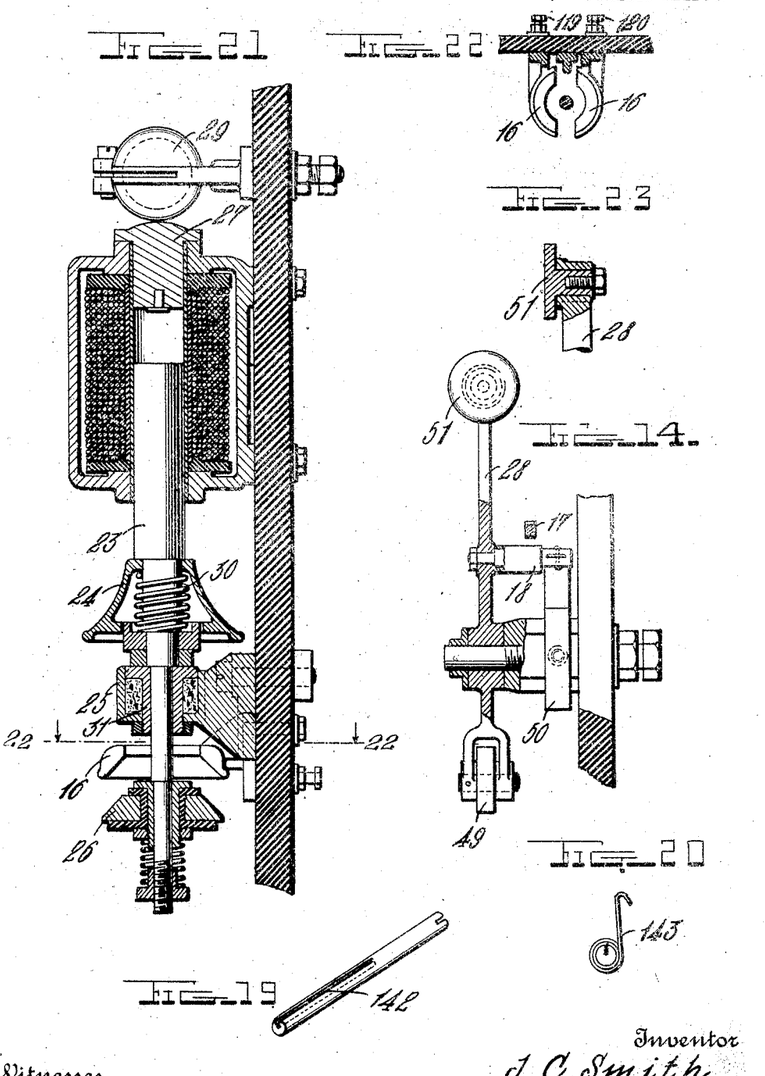
Fig. 14 is a fragmentary, partly sectional, view of one of the main switch levers.
Figs. 19 and 20 are detail perspective views of certain parts of the speeding switch.
Fig. 21 is a vertical transverse section taken on line 21—21 of Fig. 1.
Fig. 22 is a horizontal section taken on line 22—22 of Fig. 21.
Fig. 23 is a detail sectional view of the upper portion of the main switch lever shown in Fig. 17.

26 indicates a carbon disk which makes contact with 16 before contact is made between 28 and 29. When the carbon disk 26 and contacts 16 close, the dynamic braking resistance is short circuited.

25 indicates a buffer bracket carrying the sleeve 31 which rests on felt washers contained in the buffer bracket 25. Each of the main switch levers 28 has connected to it a phosphor bronze spring 50 and a contact roller 18 which engages the contact 17. The upper end of each lever 28 carries brass contact 51.

32 indicates the carbon carriers of the reversing switch which carry the carbon blocks 33 which are adapted to engage the metallic contacts 93 and 94. Extending into the accelerating solenoid is a plunger 19, the lower end of which works in the air dash pot 6. A perforated brass disk 35 is arranged on the lower end of the plunger 19 and clamps a leather cup 36 against the aluminum follower 37. The plunger is also provided with an air vent plug 38 and a ball check 39.

Figure 10:
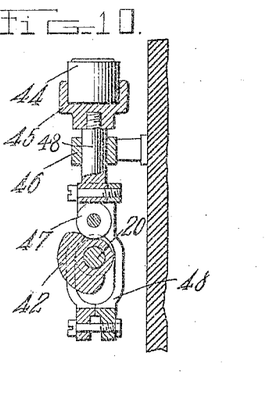
Fig. 10 is a sectional view of one of the accelerating switches.
Figures 11, 12:
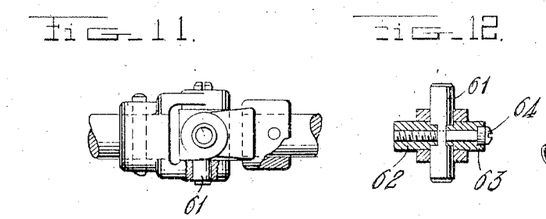
Fig. 11 is a plan view of the universal coupling for the crank disk shaft shown in Figs. 1 and 2.
Fig. 12 is a vertical transverse section of Fig. 11.
Figure 13:
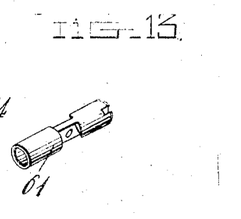
Fig. 13 is a detail perspective view of one of the parts of the coupling.

40 is an air vent regulating screw, and 41 a rubber buffer disposed beneath the vent plug. The cam shaft 20 carrying the cams 42 is mounted in suitable bearings 43 beneath the solenoid 5 and operates to close the accelerating switches. Each of the accelerating switches comprises a carbon contact 44 in Fig. 10 arranged in the carrier 45 secured to the upper end of the plunger 48 which works through a guide 46. The lower end of the plunger is provided with a roller 47 which is engaged by a cam 42 carried by the shaft 20.

12 in Figs. 15 to 18 indicates the speeding switch which is a combination of a resistance inserting switch and magnetic blowout. The speeding switch comprises the magnet spool 52 which is insulated from the pole 53 and brass contact lever 54.

55 is a carbon contact, 56 a brass contact, 57 an attracting armature and 58 magnet spool terminals.

Figure 24:
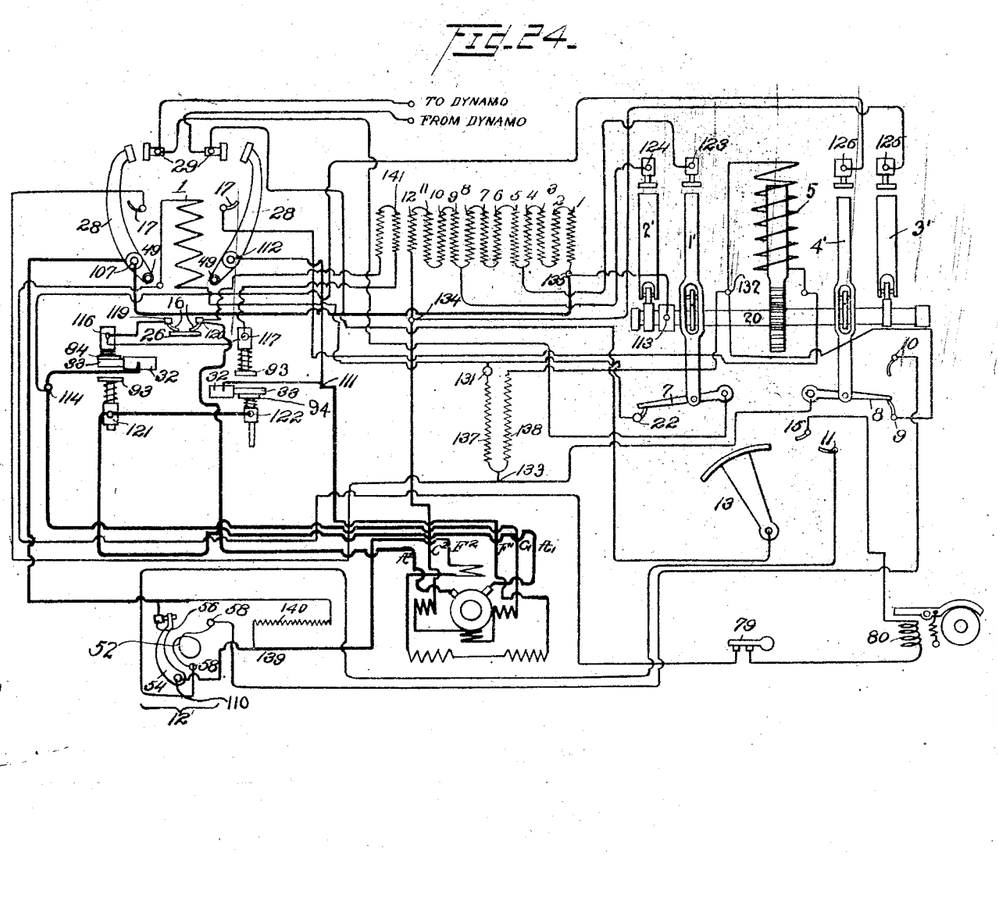
Fig. 24 is a diagrammatic view showing the system of wiring connections for the mechanically operated controller shown in Figs. 1 and 2, the parts being in position they would assume when lever 4 is actuated to move reversing switch in one direction from its normal intermediate position and thereby close the circuit through the magnet of the main switch, the latter being shown diagrammatically in an intermediate position with contacts 16, 26 just engaged and the contacts 28, 29 about to be engaged.

141 in Fig. 24, represents a dynamic braking resistance having its circuit wires connected to the reversing and main switches as shown in said figure and which is placed in series with the armature by the separation of contacts 16, 26 of the main switch when reversing switch 2 is in its intermediate position. It will be noted that the closing of contacts 16, 26 will cause the resistance 141 to be short circuited.

Figures 3, 4:
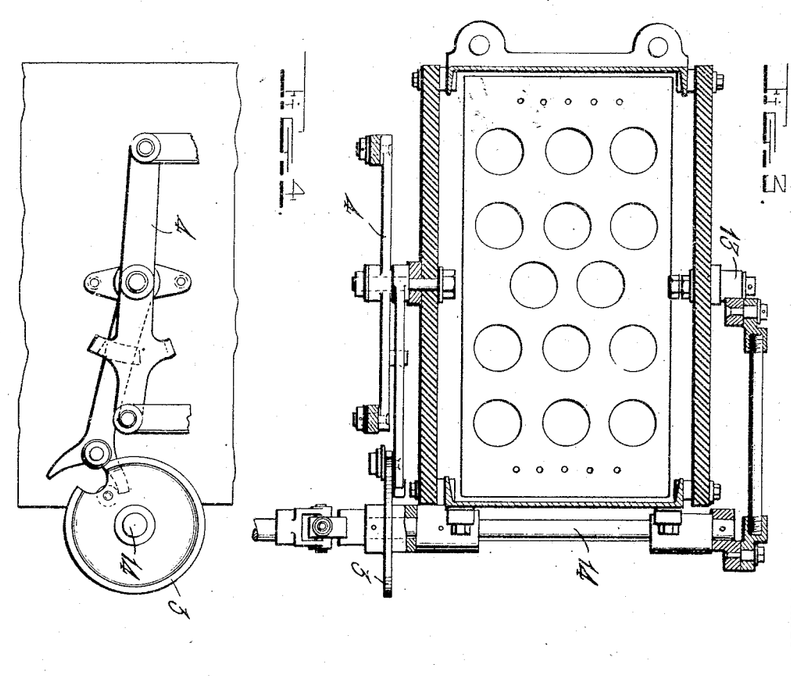
Fig. 3 is a plan view partly in section of Figs. 1 and 2.
Fig. 4 is a fragmentary view, in elevation, of the reversing switch levers and crank disk in running position.
Figure 5:
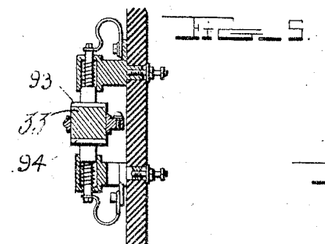
Fig. 5 is a vertical transverse section taken on line 5—5 of Fig. 1; showing one of the carbon and metallic contacts of the main switch.
Figure 6:
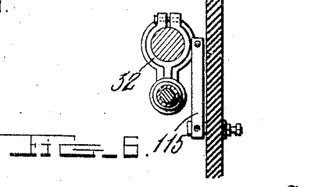
Fig. 6 is a detailed sectional view, partly in plan on line 6—6 of Fig. 1.
Figure 7:
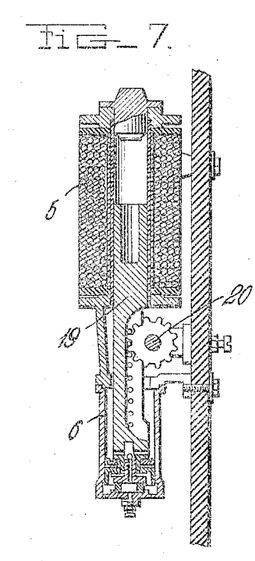
Fig. 7 is a vertical transverse section taken through the accelerating solenoid and the cam shaft, the plane of the section being indicated by the line 7—7 in Fig. 2.
Figure 8:
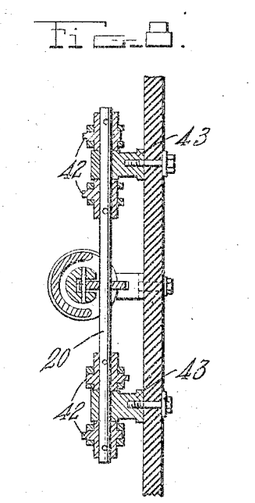
Fig. 8 is a horizontal section taken on line 8—8 of Fig. 2.
Figure 9:
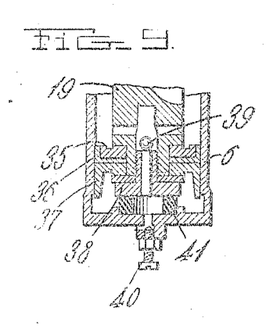
Fig. 9 is a fragmentary vertical sectional view on an enlarged scale of the lower portion of Fig. 7.

I will now describe the operation of the mechanically operated elevator controller, referring more particularly to Figs. 1, 2 and 24. I will now pull cable, and revolve shaft 14, and place reversing switch in running position as shown at Fig. 4. The reversing switch being set carbon contacts 33 have broken contact with metallic contacts 93 but are still holding contact with metallic contacts 94, as illustrated diagrammatically in Fig. 24. I will continue to pull cable until the pilot switch lever 13, makes contact with contact 15. This closes the circuit for the main switch solenoid 1 which operates the main switch, thus causing motor to start slow speed.

The circuit for the main switch solenoid is as follows: Current flows from dynamo to one of the contacts 29, on main switch then down to and through pilot switch lever 13, to contact 15, then through brake solenoid 80, then through slack cable switch 79, then up to main switch then through main switch solenoid 1, then down to terminal 131, then to contact 22, on through lever 7, then back to other contact 29, on main switch, then back to dynamo. The main switch solenoid circuit being closed causes main switch to operate, thereby causing levers 28, to make contact with contacts 17 and 29 and also causing carbon disk 26 to make contact with both brass contacts 16.

The circuit for the accelerating solenoid 5 is as follows: Current flows from dynamo, to contact 29, on main switch, then through lever 28, to contact 17, then through accelerating solenoid 5, to terminal 132, then down to contact 9, on through lever 8, to terminal 133, then up to the other contact 17, on main switch, then through the other lever 28, to the other contact 29, then back to dynamo. The accelerating switches now start to operate.

The armature and series field circuit of motor is as follows: Current flows from dynamo, to contact 29, on main switch then through lever 28, then down to terminal 111, then to carbon carrier 32, to carbon 33, then through metallic contact 94, then to terminal 122, then to 121, then over to terminal A', on motor through armature coils out to A², up to 120, then through both contacts 16, and carbon disk 26 to terminal 119, then to 116, then through contact 94, carbon 33, carbon carrier 33, to terminal 114, then down to C¹, on motor, then through series field windings of motor and out to C², then up to terminal 134, then up to resistance tube 12, then through resistance tubes 12, 11, 10, 9, 8, 7, 6, 5, 4, 3, 2, 1, then to terminal 135, then over to terminal 107 on main switch, then through lever 28, to contact 29, then back to dynamo.

The circuit for shunt fields of motor is as follows: Current flows from dynamo to contact 29, then through lever 28, terminal 112, then down to terminal 111, then down to F¹ on motor then through shunt fields of motor and out to terminal F², on motor, then over to terminal 110, then through lever 54, to contact 56 on speeding switch then to terminal 107, on main switch, then through lever 28, to contact 29, then back to dynamo.

I will now describe the manner in which the armature resistances are cut out of the armature circuit of the motor by the successive operation of the accelerating switches. When accelerating switch 1' operates, resistance tubes 1, 2, 3, 4, are cut out. When accelerating switch 2' closes, resistance tubes 5, 6, 7, 8 are cut out. When accelerating switch 3' operates resistance tubes 9, 10, 11, 12 are cut out. When accelerating switch 4' closes the armature circuit is then thrown direct across the line with the series field windings cut out.

When accelerating switch 1¹ closes, the armature and series field circuit of motor is as follows: Current flows from dynamo to contact 29, it then takes the same route as before, on its way through armature and series field windings, then through resistance tubes 12, 11, 10, 9, 8, 7, 6, 5, then out to terminal 123 on accelerating switch 1', then contact 136 and carbon 44, through switch plunger 48, then through shaft 20, then through bearing 43, to terminal 113, then out to terminal 135, then over to terminal 107 on main switch, then up through lever 28, to contact 29, back to dynamo.

When accelerating switch 2¹ closes, the armature and series field circuit is as follows: Current flows from dynamo to contact 29, it then takes the same route as before on its way through armature and series field windings, then through resistance tubes 12, 11, 10 and 9, then out to terminal 124 on accelerating switch 2', then through switch plunger of accelerating switch 2', then through shaft 20, to terminal 113, then to 135, then back to terminal 107 on main switch, then through lever 28, to contact 29, then back to dynamo.

When accelerating switch 3¹ closes, the armature and series field circuit of motor is as follows: Current flows from dynamo to contact 29, it then takes the same route, as before, on its way through armature and series field windings until it reaches terminal C², then up to 134, then over to terminal 125 of accelerating switch 3', then through accelerating switch 3', then through shaft 20, to terminal 113, then over to terminal 135, then over to terminal 107 of main switch, then through lever 28, to contact 29, then back to dynamo.

When accelerating switch 4¹ closes, the armature circuit of motor is as follows: Current flows from dynamo contact 29, then through lever 28, to terminal 112, then to 111, then through reversing switch to 122, then to 121, then to A', then through armature coils and out to terminal A², on motor, then up to 120, then through switch 16, to terminal 119, then over to 116, then through reversing switch to terminal 114, then up and over to terminal 126, on accelerating switch 4', then down through accelerating switch 4', then through shaft 20, on out to terminal 113, then to terminal 135, then over to terminal 107 on main switch, then through lever 28, and out of contact 29, then back to dynamo.

When accelerating switch 1¹ closes, lever 7 and contact 22 separate, thereby inserting resistance 137 into the main switch solenoid circuit. By referring back to the description of the starting circuit for the main switch solenoid, it will be seen that current was flowing from dynamo on through solenoid I to terminal 131, then through lever 7, and back to dynamo. Now since lever 7 and contact 22 are broken, current must flow from solenoid to terminal 131, then through resistance tube 137, then to terminal 133, then back to contact 17, then through main switch lever 28, then out contact 29, then back to dynamo.

When the last accelerating switch 4', closes, it also moves lever 8 into engagement with contact 10, and this connects up one side of the circuit of the magnet coil 52 of speeding switch 12. I will now continue to pull cable and move pilot switch lever 13, and make contact with contact 11, which will close the other side of the circuit for the magnet coil 52 of speeding switch 12, which latter will then operate and cut in resistance 141 into the shunt field circuit of motor, thereby causing motor to run high speed.

The circuit for magnet 52 of speeding switch 12, is closed as follows: Current flows from dynamo to contact 29, on main switch then down to pilot switch lever 13, then out of 13, to contact 11, then out to terminal 58, on speeding switch 12, then through magnet coil 52 and contact 58 then back up to contact 10, then through lever 8, to terminal 133, then up to contact 17 on main switch, then through lever 28, to contact 29, then back to dynamo. The speeding switch now operates and breaks contact between lever 54 and contact 56 to throw resistance 140 into shunt field and thereby allow motor to speed up.

By referring back to the description of the circuit for the shunt fields of motor, it will be seen that current was flowing from dynamo, through shunt fields of motor, then through lever 54 and contact 56 of speeding switch 12, and then back to dynamo. Now since lever 54 broke contact with contact 56, current must flow from dynamo then through shunt fields of motor coming out at terminal F² on motor, then to terminal 139, then through resistance tube 140, then up to 107, then through main switch lever 28, out of contact 29, then back to dynamo. The elevator is now running at high speed. Now presume while elevator is running, that the main switch should for some reason fall out, and the accelerating switches (which should also fall out, because the circuit for accelerating solenoid will be broken when main switch falls out), should fail to return to their starting or original positions. When this happens, the operator cannot close the main switch. If he could, he would start up the motor instantly, with all of the starting or armature resistances cut out (due to the accelerating switches being closed) and that would damage the motor.

I will now describe the manner in which the circuit for main switch solenoid was opened to prevent the main switch from being again closed while the accelerating switches remain closed. By referring back to description of the circuit for the main switch solenoid, when resistance 137 was inserted by the action of accelerating switch 1', the current passes from the dynamo on through main switch solenoid to terminal 131, on through resistance tube 137, to 133, then to contact 17 on main switch on through lever 28, and back to dynamo. Now since main switch is opened, the lever 28 is thereby caused to break with contact 17.

Lever 8, and contact 10 serve as a timing switch for regulating the time from starting the motor, until the motor is speeded up. Lever 8 and contact 10 are used to prevent the elevator from being started up full speed should the operator in starting move pilot switch lever 13, over instantly and touch contact 11. By this arrangement it will be seen that even though the operator should instantly throw pilot switch lever 13 over and make contact with contact 11, the controller will then start up motor slow speed, then cut out armature resistances, then lever 8 and contact 10 will close and cause motor to speed up.

In stopping elevator, when main switch falls out, and reversing switch returns to its central position, (in which position both carbons 33 are making contact on both sides with both metallic contacts 93 and 94) the armature and shunt field circuits are each short circuited as hereinafter explained.

The manner in which the armature is short circuited onto itself is as follows: At the instant that the reversing switch centered, the induced current from armature of motor is kicking back from armature to terminal A' on motor, then back to 121, then over to 122, up through reversing switch to 117, then up and through dynamic resistance 141 (which was cut in when switch 16 broke the circuit between terminals 119 and 120) then to terminal 120, then back on through armature again by going to terminal A², thereby causing a dynamic braking effect on armature. At the instant the reversing switch centered the induced current from shunt fields of motor, is kicking back through shunt fields of motor coming out at terminal F¹ on motor, then to terminal 111, then through reversing switch to 117, then over to 116, then through reversing switch to 114, then to C¹ on motor, then through series field windings of motor coming out at C², then up and through armature resistance tubes 12, 11, 10, 9, 8, 7, 6, 5, 4, 3, 2, 1, then out to terminal 135, then over to terminal 107, on main switch, then down through 56 on speeding switch, to 110 on speeding switch, then back to F² on motor, then to shunt fields and onto itself. By handling the kick from the shunt fields in the manner described, all arcing and burning of contacts is prevented and a dynamic braking effect on armature is caused.

Figure 25:
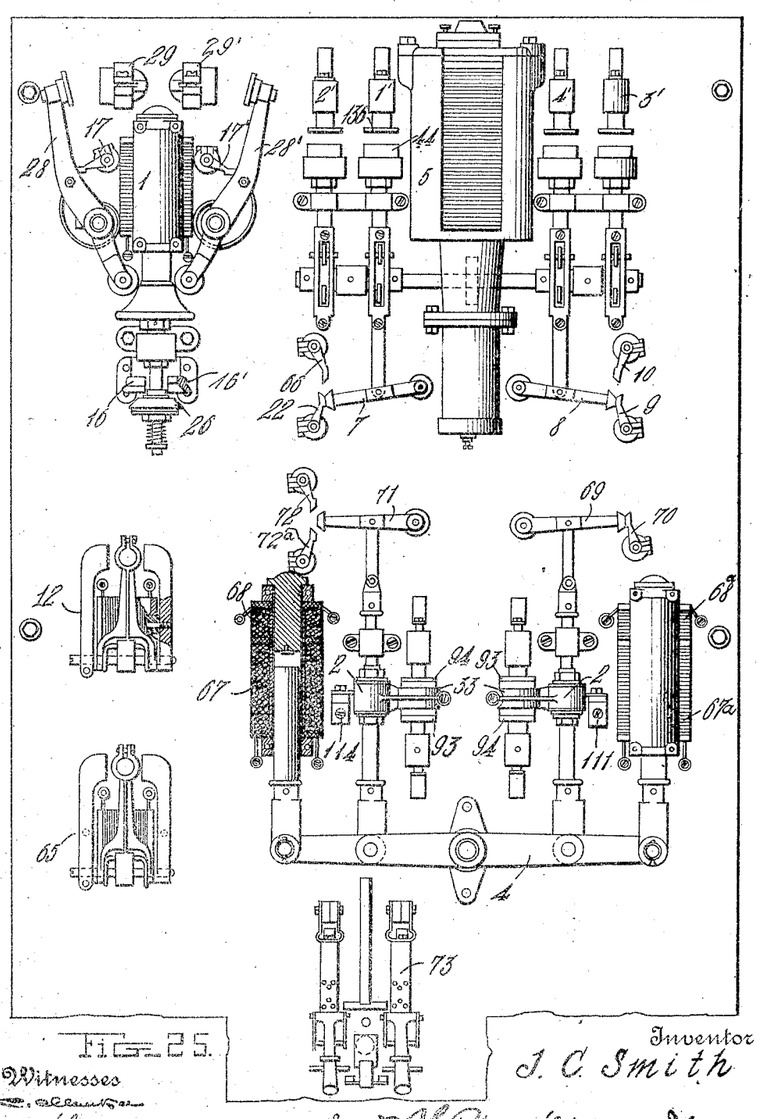
Fig. 25 is a front elevation of the switch panel of a modification of the invention, comprising a variable speed full magnet motor controller for elevators.
Figure 26:
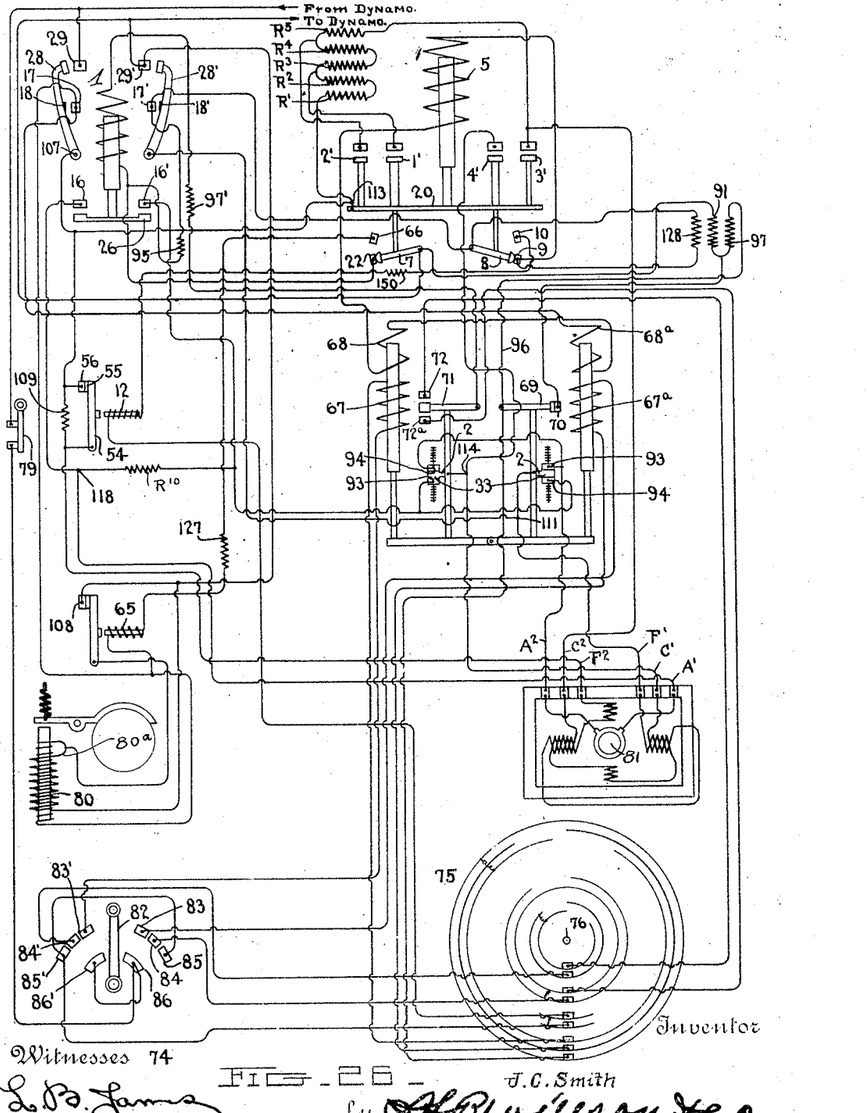
Fig. 26 is a diagrammatic view showing the circuits used for the controller illustrated in Fig. 25.

Referring to Figs. 25 and 26 which represent that modification comprising the variable speed full magnet motor controller, 65 indicates the switch for inserting resistance 80ª into the brake coil. Lever 7 and contact 66 close the circuit of switch 65. 67, 67ª are reversing switch solenoids. 68, 68ᵃ are locking coils which are connected in series with solenoid 5. Lever 69 and contact 70, are for inserting the additional resistance 97 into the circuit of the reversing switch solenoids 67, 67ᵃ. Lever 71 and contacts 72, 72ᵃ are direction contacts for main switch solenoid 1. 73 in Fig. 25 is the usual circuit breaker or cut out switch which is not shown in Fig. 26. Referring to Fig. 26, 74 is the car switch, which is carried and operated in the elevator car. The car switch as shown is in central position. 75 is the automatic limit stop switch, which stops the elevator automatically at top and bottom landings at all times, independent of the operator, who might for some reason fail to return the car switch back to its central position or dead center. The automatic limit switch is of the usual construction having brass disks, insulated from each other, also insulated from and revolved by a shaft 76, which is connected to elevator hoisting machine. The brass disks make contact with suitable fingers to which the circuit wires are connected in the usual manner. The elevator motor is shown at 81. 79 is the slack cable stop, which is operated only when elevator hoisting cables become slack. 80 is the brake solenoid which is energized to release the brake shoes on motor shaft of elevator machine. The car switch or controller in Fig. 25 is in central position, with main switch open, and reversing switch closed on both sides. The reversing switch in this position, short circuits the armature onto itself through a resistance $R^{10}$, which is inserted by the opening of switch 16, this causing a dynamic braking on armature. The reversing switch in the above-named position, also closes the shunt field onto itself, which prevents any arcing and burning of contacts, caused from the induced current from motor fields.

$R^{10}$ in Fig. 26 represents a dynamic braking resistance (corresponding to resistance 141 in Fig. 24) which is placed in series with the armature by the separation of contacts 16, 16', 26 of main switch when reversing switch is in its intermediate position, and which is hence short circuited by the main switch as the latter closes.

Turning car switch lever 82 in one direction will cause elevator car to run up; and turning car switch in opposite direction will cause elevator car to run down. Turning car switch lever to the right until it touches contacts 83, and 86, energizes the reversing switch solenoid 67ᵃ, which shifts the reversing switch 2 in the desired direction. The movement of the reversing switch breaks contact between lever 69 and contact 70 which inserts resistance 97 into the circuit of energized solenoid 67ᵃ, and also closes contact between lever 71 and contact 72ᵃ.

The lever 71 and contact 72ᵃ now being closed, a path is closed for line current to one side of the main switch solenoid 1. A further movement of the car switch lever 82 until it touches contact 84 energizes the main switch solenoid 1, by giving line current to its opposite side. The main switch now being energized first closes switch 16, which cuts out the dynamic braking resistance $R^{10}$. It then closes 17 and 18, and 17' and 18', which gives current to brake solenoid 80, and accelerating solenoid 5, and also to both locking coils 68, 68ᵃ for the reversing switch plungers. The locking coil 68ᵃ on the energized solenoid 67ᵃ will hold reversing switch plunger in the position set, in case the main solenoid 67ᵃ fails.

Figure 15:
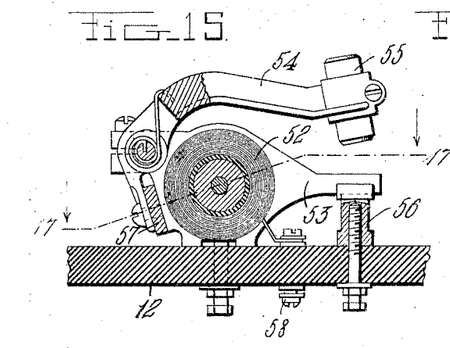
Fig. 15 is a detail sectional view of the speeding switch.
Figure 16:
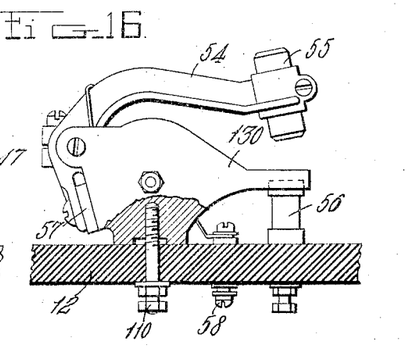
Fig. 16 is a side elevation, partly in section.
Figure 17:
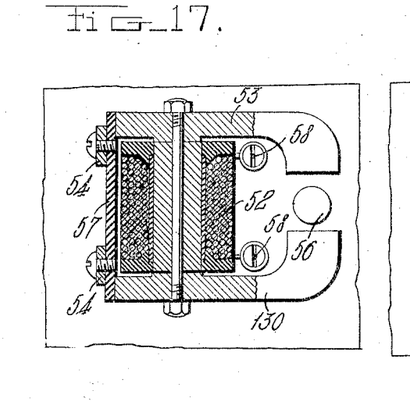
Figure 18:
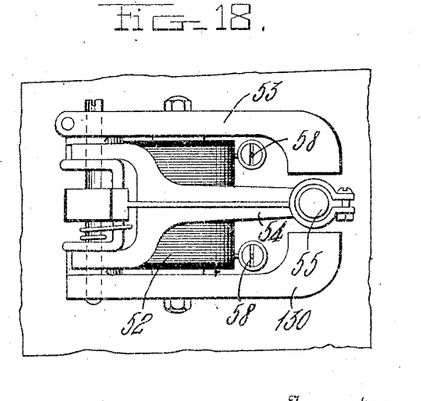

The movement of the first accelerating switch 1' causes lever 7 to rise, thereby disengaging it from 22, which inserts resistance 95 into the main switch solenoid 1 and also forms an open circuit to the main switch solenoid 1 after main switch opens, such open circuit remaining until lever 7 and contact 22 again engage. The above open circuit is to prevent the main switch 1, from going in, in case for some reason, the accelerating plunger and switches fail to return to their starting position. After 7 and 22 are separated, lever 7 engages contact 66 to close the circuit of the magnet of brake switch 65, which latter operates to insert resistance 80ᵃ into the brake solenoid 80. The movement of the last accelerating switch 4' separates lever 8 from contact 9, which inserts resistance 128 into the circuit of solenoid 5. After 8 and 9 separate, lever 8 engages contact 10 to close the circuit on one side of magnet of the speeding switch 12. The last accelerating switch also cuts out the series field windings in motor. Then a further movement of the car switch lever 82, until it touches contact 85, closes the circuit on the opposite side of magnet of speeding switch 12, thereby completing the circuit. The speeding switch armature, 57, Fig. 15, is then attracted and opens contacts 55, and 56, in Fig. 15, thereby throwing resistance 109 into shunt circuit to permit the motor to speed up.

The reverse operation of the modification just described is as follows: Car switch lever 82 is turned to the left until it touches contacts 86', and 83'. Current then flows from dynamo to contact 86', then through car switch lever 82, to the contact 83', then to and through reversing switch solenoid 67, to and through the automatic limit switch 75, then to lever 69; then through contact 70, on through resistance 91 until it reaches the terminal of lever 7, then back to the dynamo. The dynamo circuit now being closed for the reversing switch solenoid 67, the solenoid plunger rises, thereby separating the double faced carbons 33, from both metallic contacts 93, but still holding and compressing both metallic contacts 94. The reversing switch carbon 33, now making contact with metallic contacts 94, sets the direction for the flow of current to motor. The reversing switch in operating also causes lever 71 to rise and touch contact 72 thereby giving line current to one side of main switch solenoid. Thus, it can be seen that the main switch solenoid circuit cannot be closed until the reversing switch operates and closes contacts 71 and 72.

When the reversing switch solenoid plunger 67 nearly completes its upward movement, the lever 69 breaks contact with contact 70 which inserts an additional resistance 97 into the circuit of reversing switch solenoid 67. By referring to the description of the circuit for the reversing switch solenoid 67, it will be seen that current (before the reversing switch operated) was flowing through lever 69 and contact 70, and then up through resistance 91 to terminal of lever 7 but after the reversing switch operates to separate 69 and 70, the current instead of flowing through lever 69, flows up wire 96, on through both resistances 97 and 91 to the terminal of lever 7, and then back to dynamo. The reversing switch is now set with resistances 91 and 97 inserted in the circuit of solenoid 67. The elevator car will not start to travel until the operator moves lever 82 until it touches contact 84'. By moving car switch lever 82, to left until it touches contact 84', this closes other side of circuit of solenoid of main switch which then operates to close motor circuits so the elevator car starts at slow speed.

With car switch lever 82, engaging contact 84', current flows from the dynamo to contact 86' in car switch box, then through lever 82, to contact 84', then to the automatic limit switch 75, then up to contact 72 through lever 71, then on through resistance tube 97' to and through the main switch solenoid 1, to contact 22, on through lever 7, then back to the dynamo. The starting circuit for the main switch solenoid now being closed causes the main switch to operate, thereby causing the contacts on both levers 28, 28' to make contact with contacts 29, 29' and 17, 17' respectively; and also causes the carbon disk 26, to make contact with both brass contacts 16, 16'. The main switch now being closed, closes the different circuits for the accelerating solenoid, the reversing switch locking coils, the brake solenoid and the armature and field circuits of motor.

The circuit for brake solenoid 80 is as follows: Current flows from dynamo to contact 29, on main switch, then through lever 28, to contact 17, then down through heavy brake coil of brake solenoid 80, then to and through brake switch lever to contact 108, then up to the other contact 29', on main switch and then back to the dynamo. The brake switch 65, and speeding switch 12, are alike.

The circuits for the accelerating solenoid 5 and locking coils 68, 68ª are as follows: Current flows from dynamo to contact 29, on main switch through lever 28, to contact 17, then to and through the right hand reversing switch locking coil 68ª, then to and through the other locking coil 68, to and through the solenoid 5 of the accelerating switch, thence to contact 9, thence through the resistance 128 to the pivotal point of lever 8, thence to other contact 17', then through lever 28', to contact 29', then back to dynamo. The accelerating switches now start to operate.

The circuit for the shunt fields of motor is as follows: Current flows from dynamo to contact 29, then through lever 28, to contact 56, on speeding switch, then through lever 54, on speeding switch, to terminal $F^2$, on motor, then through shunt fields back up to terminal $F^1$, on motor, then up to and through lever 28' to contact 29', and back to dynamo.

The armature and series field circuit is as follows: Current flows from dynamo to contact 29, on main switch, then through lever 28, to terminal 107, then down to terminal 113, then through resistance $R'$ to $R^5$, then to terminal $C^2$, on motor, then through series fields of motor, out through terminal $C'$, to terminal 114, then through carbon carrier to its carbon 33, then to metallic contact 94, then to terminal $A^2$, on motor, then through armature coils of motor, then out to terminal $A'$ of motor, then over to terminal 118, then to and through both contacts 16, 16' and carbon disk 26, then to and up through lower metallic contact 94, then to carbon 33 of carbon carrier, to terminal 111, then up to main switch, through lever 28', to contact 29', on back to dynamo. The above described circuit is the one in which the current is flowing to the armature and series field windings of motor, before the accelerating switches start to operate. Up to this point the car switch lever 82, is assumed to be still in contact with contact 84'. The armature and field circuits of motor are now closed, which starts up motor with all of the armature resistance cut into armature circuit of motor. The circuit of accelerating solenoid 5, being closed, the accelerating switches start to rise successively, to cut out armature resistance of motor.

Resistances $R'$ and $R^2$ are cut out when accelerating switch $1^1$ closes resistances $R^3$ and $R^4$ are cut out when accelerating switch $2'$ closes; resistance $R^5$ is cut out when accelerating switch 3' closes; and when accelerating switch 4' closes the series field windings of motor are cut out.

When accelerating switch 1¹ closes the circuits for armature and series field windings are as follows: Current flows from dynamo to contact 29, through lever 28, to terminal 113, then through shaft 20, up through switch plunger 1¹, and its contact, then to and through resistances R³, R⁴ and R⁵ to terminal C², on motor, on through series field windings of motor to terminal C¹, then to terminal 114, to upper terminal 94, then to terminal A² through the armature coils of motor, then out to terminal A¹, on to terminal 118, to and across contacts 16, 16' and 26 to lower right hand contact 94, then to point 111 up to lever 28', and out of 29' back to dynamo.

When accelerating switch 2¹ operates, current flows from dynamo through lever 28 to terminal 113 through shaft 20, through switch plunger 2¹, to and through resistance R⁵ then to terminal C² of motor through the series field windings of motor to terminal C¹, then to terminal 114, to upper contact 94, to A² on motor, through armature coils out to A¹, then to 118, up through contacts 16, 16' and 26, through lower contact 94, to terminal 111 up to and through lever 28', to contact 29', then back to dynamo.

When accelerating switch 3¹ operates, current is flowing from dynamo through lever 28 to terminal 113, through shaft 20, up through the switch plunger of 3' to the contact of switch 3', down to terminal C², then through series windings of the motor, out to terminal C¹, through the upper left hand contact 94, to A² on the motor, then through armature coils of motor, then to A¹, then to 118, across 16, 16' and 26 to lower contact 94 up through carbon 33, then down to terminal 111, up to and through lever 28', to contact 29', then back to dynamo.

When accelerating switch 4¹ closes, the armature circuit of motor is closed direct across the line thereby cutting out the series field windings entirely.

After all the accelerating switches are closed, the armature circuit of motor is as follows: Current flows from dynamo to contact 29, on main switch, then through lever 28, to terminal 113, through shaft 20, to the switch plunger of 4' then to its contact, then down to 114, then to upper metallic contact 94, down to A², on motor, on through armature coils out to A¹, then to 118, to and through 16, 16' and 26, through lower metallic contact 94, carbon 33, to terminal 111, then up to main switch, through lever 28', out of contact 29', back to the dynamo. The accelerating switch 1¹ being closed, the lever 7, breaks contact with contact 22, which cuts in resistance 95 into main switch solenoid. By referring back to the description of the starting circuit for main switch solenoid, it will be seen that the current was flowing through main switch solenoid to and through lever 7, back to dynamo. Lever 7, having broke contact with contact 22, causes current to flow from the terminal of the solenoid 1 through resistance 95, up to contact 17', then through lever 28', to contact 29', then back to dynamo. It will be seen that when the main switch falls out and the accelerating switches fail to return by gravity to their starting position, the main switch solenoid cannot be energized until lever 7 closes on 22, which closes the starting circuit for the main switch solenoid.

By referring back to the description of the circuit for the main switch solenoid when lever 7 and contact 22 broke contact, it will be seen that current was flowing through the solenoid 1 to and through resistance 95, up to contact 17', then through lever 28', to contact 29', and back to dynamo; hence, if the main switch falls out for some reason, the lever 28' breaks contact with contact 29', which opens the circuit to main switch solenoid, thereby forming the so-called open circuit. The accelerating switch 1¹ being closed, the lever 7 makes contact with contact 66 and thereby closes the circuit for the magnet of brake switch 65, which in return operated the switch 65, thus cutting in the fine brake coil 80ᵃ in series with the heavy brake coil, thereby inserting resistance into the heavy brake coil of solenoid 80.

The circuit of the magnet of switch 65 is as follows: Current flows from dynamo to contact 29, on main switch, then through lever 28, to contact 17, then down to and through the magnet of switch 65, up to and through resistance 127, over to contact 66, then through lever 7, and back to dynamo. The circuit for magnet of switch 65, being closed, the switch lever breaks contact with contact 108. By referring back to the description of circuit for brake solenoid 80, it will be seen that current was flowing through the brake solenoid to and through switch lever to contact 108; now since switch lever has broken contact with contact 108, current must now flow from dynamo to and through the heavy brake coil to and through the fine brake coil 80ᵃ up to the branch leading to contact 108, then up to contact 29', on main switch and then back to dynamo.

The accelerating switch 4' being closed, members 8 and 9 have broken contact which inserts resistance 128 into the accelerating solenoid 5. By referring back to the description of the starting circuit for the accelerating solenoid 5, it will be seen that current was flowing through said solenoid on down to 9, then through lever 8, and out.

Now since lever 8 and contact 9 are separated, current must flow through solenoid 5 down to contact 9, then through resistance 128, then over to the terminal of lever 8, then through lever 28′, to contact 29′, and back to the dynamo. The accelerating switch 4′ being closed, the lever 8 and contact 10 are closed to connect up one side of circuit of magnet of switch 12. The switch 12 will not operate however, until the operator closes other side of such circuit by moving lever 82, so that it touches contact 85′. Up to this point, it is assumed that car switch lever 82 is still in contact with 84′, so that the motor is running with all the armature resistance and series field windings cut out. Resistance 109 is still out of the shunt fields of motor. If now the car switch lever 82 is moved to the left, until it touches contact 85′, a circuit will be closed for the magnet of switch 12, which will in return cut in resistance 109 into the circuit for the shunt fields of motor, thereby causing the motor to speed up and run the elevator at high speed.

The circuit for the magnet of speeding switch 12, is as follows: Current flows from dynamo to contact 86′, then through lever 82, to contact 85′, then to and through the automatic limit switch, then up through magnet 12, then through a resistance 150 to contact 10, then through lever 8, to contact 17′, on main switch, then through lever 28′, and out of contact 29′ back to the dynamo.

Lever 8 and contact 10 serve as a timing switch for determining the time from starting the motor, until the motor is speeded up. Lever 8 and contact 10 are used to prevent the operator from starting the elevator car instantly, on high speed, and consequently with a jerk. By using lever 8 and contact 10, should the operator in starting, instantly throw his car switch lever 82 over and touch contact 85′, will nevertheless start up at slow speed, then the armature resistance will be cut out, then lever 8 will engage contact 10 to close the circuit of speed switch 12 and cause the latter to throw resistance 109 into the shunt circuit, thus permitting the motor to speed up. The circuit for magnet of speeding switch 12 being closed, switch 12 operates and causes lever 54 to break contact with contact 56 and throw resistance 109 into shunt circuit of motor.

By referring back to the description of the circuit for the shunt fields of motor, it will be seen that current flowed from the dynamo to contact 56, on the speeding switch 12, then through the lever 54, then out to and through the shunt fields of the motor back to the dynamo. When lever 54 breaks contact with 56, current flows from the dynamo through lever 28, down to contact 56, on speeding switch 12, then through resistance 109, down to and through the shunt fields of motor, then up to 111, then through lever 28′ out through contact 29′, then back to the dynamo. The car is now running at high speed. In stopping, when the car switch lever 82 is returning to its middle position and breaks contact with 85′, resistance 109 is cut out of the shunt fields of motor, thereby causing the motor to slow down. By continuing to return car switch lever 82 until it breaks contact with contact 84′, the main switch falls out, which cuts off the source of current from the armature and fields of motor. When lever 82 breaks contact with contact 83′, the circuit for the reversing switch solenoid is broken, which allows the reversing switch to return to its central position. At the instant the reversing switch centered the induced current from the armature reacts from armature to $A^2$ on motor, (where the current from dynamo had entered the armature while motor was running) thence up to the reversing switch to and through the dynamic braking resistance $R^{10}$ (which is cut in by carbon 26, breaking contact between contacts 16, 16′), then to terminal 118, then over to terminal A′ on motor, and back to armature. This causes a dynamic braking effect on armature.

By referring back to the description of the shunt field circuit after the speeding switch 12 closes, it will be seen that at the instant the reversing switch returned to central position, the induced current from the shunt fields reacts through the shunt fields of the motor and out at $F^2$, then over to speeding switch 12, then to contact 56, then through all the armature resistances, and over to terminal $C^2$, then through the series field windings of motor and out to terminal $C^1$, then up to terminal 114, then through the reversing switch to terminal 111, and down again to the shunt fields. By handling the field reaction in the manner described, all arcing and burning of contacts is prevented and a dynamic braking effect on armature is caused.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a motor control system, the combination of a motor having an armature, a source of electrical supply, a running circuit for the armature, a dynamic braking resistance to be connected in series with the armature when the electrical supply is cut off, a reversing switch having intermediate and extreme positions, the latter controlling the direction of flow of the current through the armature and the intermediate position connecting the dynamic braking resistance in series with the armature, whereby a dynamic braking effect is produced, and a main switch to close the running armature circuit at two points, one connecting it with the source of electrical supply and the other short circuiting the dynamic braking resistance.

2. In a motor control system, the combination of a motor having an armature and a shunt field, a source of electrical supply, a circuit for the shunt field, a running circuit for the armature, a dynamic braking resistance to be connected in series with the armature when the source of electrical supply is cut off, a main switch to close the running armature circuit at two points, one short circuiting the dynamic braking resistance and the other connecting the source of electrical supply to the armature and shunt field circuits; and a reversing switch having intermediate and extreme positions and connected when in its extreme positions to control the direction of flow of current through the armature and when in its intermediate position to close the shunt field circuit onto itself and to also connect the dynamic braking resistance in series with the armature, whereby a dynamic braking effect is produced and excessive arcing and burning of switch contacts prevented.

3. In a motor control system, the combination of a motor having an armature, a series field and a shunt field, a source of electrical supply, a running circuit for the armature, a variable starting resistance for the armature circuit and connected in series with the series field, a dynamic braking resistance independent of said variable resistance and to be connected in series with the armature when the source of electrical supply is cut off, a double main switch to successively short circuit the dynamic braking resistance and connect the source of electrical supply to the armature and shunt field circuits when it moves to its closed position, and when moving to open position said main switch successively cutting off the source of electrical supply and opening the short circuit of the dynamic braking resistance, a reversing switch having intermediate and extreme positions and connected when in its extreme positions to control the direction of flow of the current through the running armature circuit and in its intermediate position to close the shunt field circuit onto itself with the variable resistance and series field inserted, such intermediate position of the reversing switch also connecting the dynamic braking resistance in series with the armature, whereby a dynamic braking effect is produced and an element movable to one position for causing the operation of the reversing switch and movable to another position for causing the operation of the main switch.

4. In a motor control system, the combination of a motor having an armature, a source of electrical supply, a running circuit for the armature, a dynamic braking resistance to be connected in series with the armature when the electrical supply is cut off, a magnetically operated reversing switch having intermediate and extreme positions, the latter controlling the direction of flow of the current through the armature and the intermediate position connecting the dynamic braking resistance in series with the armature, whereby a dynamic braking effect is produced, a main switch to close the running armature circuit at two points, one connecting it with the source of electrical supply and the other short circuiting the dynamic braking resistance, and circuit connections for energizing the reversing switch through the main switch.

5. In a motor control system, the combination of a motor having an armature and a shunt field, a source of electrical supply, a circuit for the shunt field, a running circuit for the armature, a dynamic braking resistance to be connected in series with the armature when the source of electrical supply is cut off, a main switch to close the running armature circuit at two points, one short circuiting the dynamic braking resistance and the other connecting the source of electrical supply to the armature and shunt field circuits, a magnetically operated reversing switch having intermediate and extreme positions and connected when in the latter positions to control the direction of flow of the current through the armature, and when in its intermediate position to close the shunt field circuit onto itself and to also connect the dynamic braking resistance in series with the armature, whereby a dynamic braking effect is produced and excessive arcing and burning of switch contacts prevented, and circuit connections for energizing the reversing switch through the main switch.

6. In a motor control system, the combination of a motor having an armature, a source of electrical supply, a running circuit for the armature, a dynamic braking resistance to be connected in series with the armature when the electrical supply is cut off, a magnetically operated reversing switch having intermediate and extreme positions, the latter controlling the direction of flow of the current through the armature and the intermediate position connecting the dynamic braking resistance in series with the armature, whereby a dynamic braking effect is produced, a magnetically operated main switch to connect the running armature circuit with the source of electrical supply, said main switch including an actuating solenoid, manually operated means for connecting said solenoid to the source of electrical supply, means operated by the main switch to short circuit the dynamic braking resistance when the switch closes and circuit connections whereby the reversing switch is energized through the main switch.

7. In an electric motor controller for elevators, the combination, with a brake magnet having two windings, a main switch magnet, a starting circuit normally including one of the brake magnet windings and the main switch magnet, an accelerating switch magnet, and a circuit in which the latter is included, of means for closing the starting circuit, means operated by the main switch magnet for closing the accelerating switch circuit, and means operated by the accelerating switch for inserting a resistance in circuit with the main switch magnet and for including the other brake magnet winding in the circuit.

8. In an electric motor controller for elevators, the combination, with a brake magnet having two windings, a main switch magnet, a starting circuit including said magnets, an accelerating switch magnet, and a circuit in which the latter is included, of means for closing the starting circuit, means operated by the main switch for closing the accelerating switch circuit, a lead joined to both brake magnet windings, an electromagnetic switch normally closing said lead, and means actuated by the accelerating switch for energizing the electromagnetic switch to open said lead.

9. In a motor control system, the combination of a motor having an armature, a source of electrical supply, a running circuit for the armature, a dynamic braking resistance to be connected in series with the armature when the electrical supply is cut off, a magnetically operated reversing switch having intermediate and extreme positions, the latter controlling the direction of flow of the current through the armature and the intermediate position connecting the dynamic braking resistance in series with the armature, whereby a dynamic braking effect is produced, a main switch to close the running armature circuit at two points, one connecting it with the source of electrical supply and the other short circuiting the dynamic braking resistance, starting resistances for the running armature circuit, an accelerating switch for cutting out said starting resistance *seriatim*, said accelerating switch including a solenoid, an accelerating switch circuit including said solenoid and the main switch, whereby when the latter closes the circuit will be connected to the source of electrical supply, and circuit connections whereby the reversing switch is energized through the main switch.

10. In a motor control system, the combination of a motor having an armature, a source of electrical supply, a running circuit for the armature, a dynamic braking resistance to be connected in series with the armature when the electrical supply is cut off, a magnetically operated reversing switch having intermediate and extreme positions, the latter controlling the direction of flow of the current through the armature and the intermediate position connecting the dynamic braking resistance in series with the armature, whereby a dynamic braking effect is produced, said reversing switch having solenoids, a magnetically operated main switch to connect the running armature circuit with the source of electrical supply, said main switch including an actuating solenoid, manually operated means for connecting said solenoid to the source of electrical supply, means operated by the main switch to short circuit the dynamic braking resistance when the switch closes, starting resistances for the armature circuit, a magnetically operated accelerating switch to cut out the starting resistances *seriatim;* said accelerating switch including a solenoid, contacts engaged by the main switch when closed, locking coils for the solenoids of the reversing switch, and an accelerating switch circuit including said locking coils, the solenoid of the accelerating switch and the last mentioned contacts.

In testimony whereof I have hereunto set my hand in presence of two subscribing witnesses.

JOHN C. SMITH.

Witnesses:
JOHN G. DAEUBLE,
C. G. ECKER.